(12) United States Patent
Nozawa (10) Patent No.: US 8,123,194 B2
(45) Date of Patent: Feb. 28, 2012

(54) ON-OFF VALVE AND PROCESS APPARATUS EMPLOYING THE ON-OFF VALVE

(75) Inventor: Toshihisa Nozawa, Amagasaki (JP)

(73) Assignee: Tokyo Electron Limited, Tokyo (JP)

( * ) Notice: Subject to any disclaimer, the term of this patent is extended or adjusted under 35 U.S.C. 154(b) by 606 days.

(21) Appl. No.: 12/076,129

(22) Filed: Mar. 14, 2008

(65) Prior Publication Data

US 2008/0230734 A1    Sep. 25, 2008

(30) Foreign Application Priority Data

Mar. 19, 2007   (JP) ................. 2007-070362

(51) Int. Cl.
*F16K 25/00* (2006.01)
(52) U.S. Cl. ......... 251/161; 251/187; 251/229; 251/263
(58) Field of Classification Search .................. 251/161, 251/187, 229, 251, 262, 263
See application file for complete search history.

(56) References Cited

U.S. PATENT DOCUMENTS

| 3,675,894 | A | * | 7/1972 | Friedell ......................... 251/163 |
| 6,990,747 | B2 | * | 1/2006 | Kitoku et al. ..................... 34/92 |
| 2006/0182534 | A1 | * | 8/2006 | Hiroki ............................ 414/217 |
| 2006/0226388 | A1 | * | 10/2006 | Hiroki ............................ 251/204 |

FOREIGN PATENT DOCUMENTS

| CN | 1538502 A | 10/2004 |
| JP | 51-126524 | 11/1976 |
| JP | 63-106468 | 5/1988 |
| JP | 09-89139 | 3/1997 |
| JP | 10-132141 | 5/1998 |
| JP | 2001-027336 | 1/2001 |
| JP | 2006-170373 | 6/2006 |
| JP | 2006-292107 | 10/2006 |

OTHER PUBLICATIONS

Chinese Office Action dated Jan. 22, 2010 with Partial English Translation.
Korean Office Action mailed Dec. 30, 2009 and the Partial English Translation of the Office Action.
Japanese Office Action mailed Jan. 27, 2009 and the English translation of the Office Action.

\* cited by examiner

*Primary Examiner* — John Fristoe, Jr.
*Assistant Examiner* — Marina Tietjen
(74) *Attorney, Agent, or Firm* — IPUSA, PLLC (57) ABSTRACT

A disclosed on-off valve includes a valve body having two openings that may place a process chamber and an evacuation apparatus in pressure communication with each other; a closure element located inside the valve body and adapted to close one of the two openings; a seal member provided in the closure element and adapted to seal the one of the two openings when the closure element closes the one of the two openings; a linear motion driver that linearly moves the closure element; a retreat portion located away from the two openings; and a pivotal motion driver adapted to pivot the closure element between a first position corresponding to the one of the two openings and a second position corresponding to the retreat portion; wherein the closure element is moved to the retreat portion by the linear motion driver and the pivotal motion driver in order to stay at the retreat portion when the closure element is away from the one of the two openings.

6 Claims, 5 Drawing Sheets

ON-OFF VALVE AND PROCESS APPARATUS EMPLOYING THE ON-OFF VALVE

BACKGROUND OF THE INVENTION

1. Field of the Invention

The present invention relates to an on-off valve provided between an evacuation apparatus and a process chamber in which a semiconductor wafer or the like is processed under reduced pressure, and to a process apparatus employing the on-off valve.

2. Description of the Related Art

When semiconductor devices are fabricated, various vacuum processes including a thin film deposition process, an etching process, and the like are carried out in process apparatuses having a chamber that can be evacuated to reduced pressure. A semiconductor wafer, which is subjected to the process, is transferred into the chamber, and undergoes predetermined processes while the chamber is evacuated by an evacuation apparatus such as a vacuum pump connected to the chamber via a vacuum line.

During the process in the chamber, the chamber pressure is controlled by adjusting the degree of opening a pressure control valve located in the vacuum line between the chamber and the vacuum pump.

In addition to the pressure control valve, an on-off valve is provided upstream or downstream of the vacuum pump in the vacuum line, in order to prevent the interior of the vacuum line from being unduly exposed to the atmosphere when the process apparatus and/or the vacuum apparatus is down for maintenance.

An example of such an on-off valve is disclosed in Patent Document 1 (Japanese Patent Application Laid-Open Publication No. H09-89139). As described in the publication, a conventional on-off valve is closed when a closure element comes in tight contact with a valve seat having an opening in order to close the opening, and opened when the closure element comes off the valve seat in order to allow a gas flow path through the opening. In order to ensure a tight closure of the valve, a ring-shaped seal member made of an elastic material is attached on the closure element. The seal member is elastically deformed when the closure element is pressed onto the valve seal in order to fully eliminate a gap between the closure element (the sealing member) and the valve seat.

Patent Document 1: Japanese Patent Application Laid-Open Publication No. H09-89139

In the above conventional on-off valve, since the closure element is linearly movable, the closure element is positioned away from the valve seat in order to face the opening of the valve seat when the valve is open. Therefore, the seal member attached on the closure element of the on-off valve is exposed to gases including CF gas and $O_2$ gas, which are used as a process gas or a cleaning gas in the process chamber of the process apparatus employing the on-off valve, when the on-off valve is open. Due to the exposure to the gases or to active species (radicals, ions) activated by plasma in the process chamber, the seal member may become deteriorated, so that sealing performance is impaired and particles may be caused to break off. As a result, the process apparatus has to be frequently down for maintenance in order to replace the seal members of the on-off valve.

In order to reduce the frequency of seal member replacements, a seal member made of a fluorinated rubber, which has high resistance to plasma and/or active species, is being used in response to a recent trend of high energy plasma being used in plasma processes. However, even such a seal member is not free from deterioration, which requires replacement of the seal member, for example, every several months. In addition, the seal member made of the fluorinated rubber is very expensive, which may increase maintenance costs. Moreover, since the process apparatus has to be down for maintenance when the seal members are being replaced, total fabrication throughput is impaired.

SUMMARY OF THE INVENTION

The present invention has been made in view of the above, and is directed to an on-off valve that can lengthen the working life of the seal member, and a process apparatus employing the on-off valve.

A first aspect of the present invention provides an on-off valve provided between an evacuation apparatus and a process chamber that can be evacuated to reduced pressure by the evacuation apparatus. The on-off valve includes a valve body having two openings that may place the process chamber and the evacuation apparatus in pressure communication with each other; a closure element located inside the valve body and adapted to close one of the two openings; a seal member provided in the closure element and adapted to seal the one of the two openings when the closure element closes the one of the two openings; a linear motion driver that linearly moves the closure element; a retreat portion located away from the two openings; and a pivotal motion driver adapted to pivot the closure element between a first position corresponding to the one of the two openings and a second position corresponding to the retreat portion, where the closure element is moved to the retreat portion by the linear motion driver and the pivotal motion driver in order to be located in the retreat portion when the closure element is away from the one of the two openings.

A second aspect of the present invention provides an on-off valve according to the first aspect, where the retreat portion is located in an inner wall portion of the valve body, the inner wall portion being away from the two openings, and wherein the linear motion driver linearly moves the closure element to the retreat portion.

A third aspect of the present invention provides an on-off valve according to the first or the second aspect, where the linear motion driver includes a cam mechanism.

A fourth aspect of the present invention provides an on-off valve according to the third aspect, where the cam mechanism is a plate cam having a groove formed therein.

A fifth aspect of the present invention provides an on-off valve according to any one of the first through the fourth aspects, where the pivot motion driver pivots the closure element and the cam mechanism.

A sixth aspect of the present invention provides an on-off valve according to any one of the first through the fourth aspects, where the closure element has a protection seal member around the seal member, and wherein the protection seal member contacts the retreat portion in order to hermetically enclose the seal member.

A seventh aspect of the present invention provides an on-off valve according to the six aspect, which further includes a groove portion around one of the two openings, wherein the protection seal member is fitted in the groove portion when the closure element closes the one of the two openings.

An eighth aspect of the present invention provides a process apparatus including a chamber in which an object to be processed is housed, the chamber being evacuated to reduced pressure; a process mechanism adapted to carry out a predetermined process on the object to be processed; an evacuation apparatus adapted to evacuate the chamber; and an on-off valve provided between the chamber and the evacuation apparatus. In this process apparatus, the on-off valve includes a valve body having two openings that may place the process chamber and the evacuation apparatus in pressure communication with each other, a closure element located inside the valve body and adapted to close one of the two openings, a seal member provided in the closure element and adapted to seal the one of the two openings when the closure element closes the one of the two openings, a linear motion driver that linearly moves the closure element, a retreat portion located away from the two openings, and a pivotal motion driver adapted to pivot the closure element between a first position corresponding to the one of the two openings and a second position corresponding to the retreat portion, wherein the closure element is moved to the retreat portion by the linear motion driver and the pivotal motion driver in order to be located in the retreat portion when the closure element is away from the one of the two openings.

According to the on-off valve according to an embodiment of the present invention, because the closure element can be moved into the retreated portion, the seal member provided in the closure element is prevented from being directly exposed to gases or active species flowing into the valve body from the chamber, thereby reducing deterioration of the seal member. Therefore, the operational life of the seal member is lengthened, the running cost of the process apparatus employing the on-off valve can be reduced, and production throughput can be increased.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Referring to the accompanying drawings, an on-off valve according to exemplary embodiments of the present invention is described. In the drawings, the same or corresponding reference marks are given to the same or corresponding members or components. It is to be noted that the drawings are illustrative of the invention, and there is no intention to indicate scale or relative proportions among the members or components. Therefore, the specific size should be determined by a person having ordinary skill in the art in view of the following non-limiting embodiments.

Figure 1:
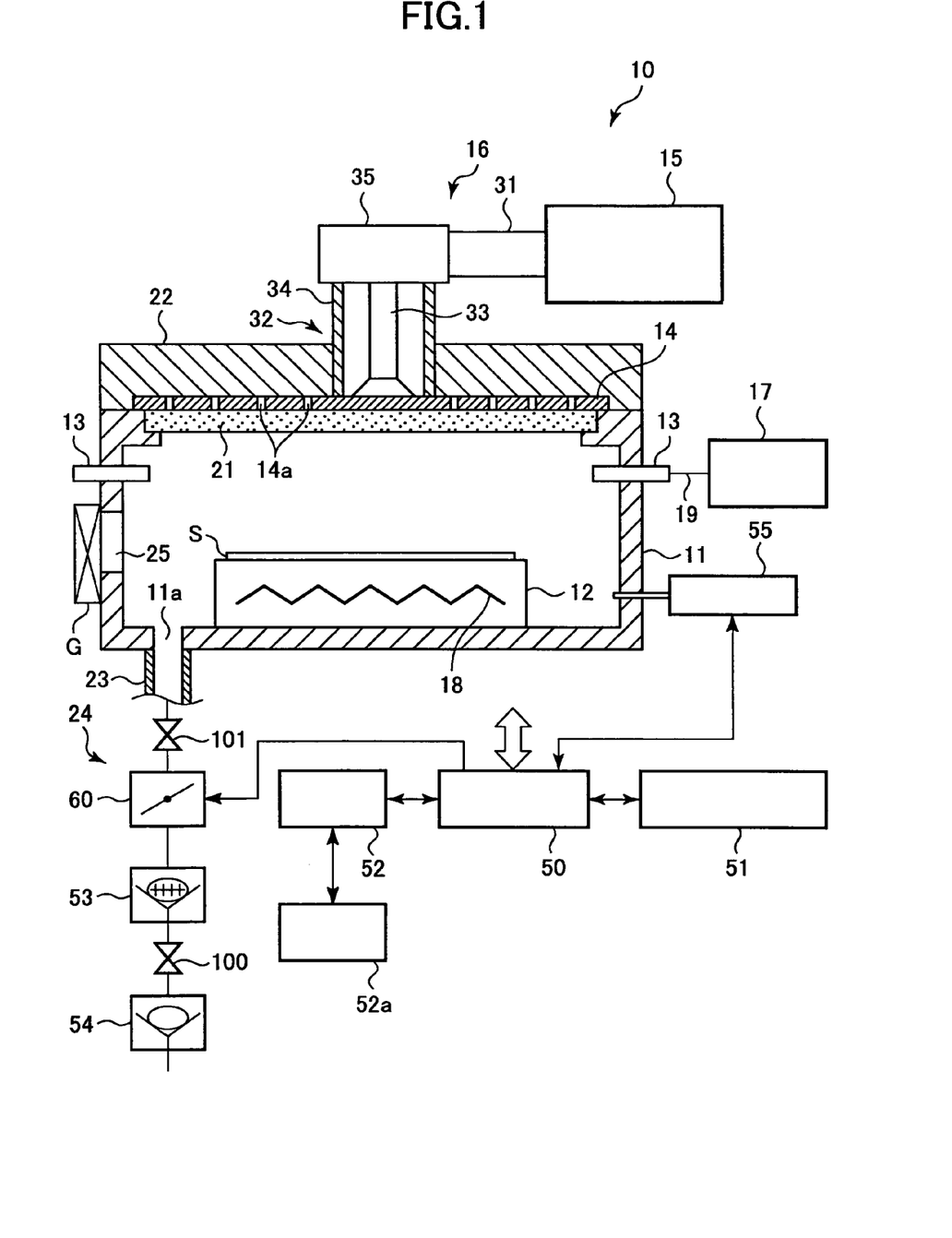
FIG. 1 is a schematic diagram of a Radial Slot Line Antenna microwave plasma apparatus according to an embodiment of the present invention.

FIG. 1 is a cutaway schematic diagram of a Radial Line Slot Antenna (RLSA) microwave plasma process apparatus employing a pressure control valve according to an embodiment of the present invention. As shown in FIG. 1, the RLSA microwave plasma process apparatus 10 includes a substantially cylindrical chamber 11 that can be evacuated to vacuum pressure, a susceptor 12 provided on the bottom surface of the chamber 11 to support a semiconductor substrate S, a gas inlet portion 13 that is substantially ring-shaped and introduces process gases into the chamber 11, a planar antenna 14 located at the upper portion of the chamber 11 in order to oppose the susceptor 12, the antenna 14 having plural slots 14a for radiating microwaves to the process chamber 11, a microwave generator 15 for generating microwaves, a microwave transmitting mechanism 16 for guiding the microwaves generated by the microwave generator 15 to the planar antenna 14, and a process gas supplying system 17 for supplying the process gases to the gas inlet portion 13.

A microwave transmission plate 21 is provided below the planar antenna 14, and a shield member 22 is provided above the planar antenna 14. The microwave transmission mechanism 16 includes a waveguide pipe 31 extending horizontally from the microwave generator 15, a co-axial waveguide pipe 32 having an inner conductor 33 and an outer conductor 34, both of which extend upward from the planar antenna 14, and a mode conversion mechanism 35 provided between the waveguide pipe 31 and the co-axial waveguide pipe 32.

An evacuation mechanism 24 including valves, an evacuation apparatus, and other equipment is connected to the chamber 11. The evacuation mechanism 24 has an evacuation pipe 23 connected to an evacuation opening 11a formed in the bottom portion of the chamber 11. In addition, the evacuation mechanism 24 includes a drag pump 53 located at the upstream portion of the evacuation pipe 23, and a dry pump 54 located at the downstream portion of the evacuation pipe 23. The dry pump 54 serves as a roughing pump that evacuates the chamber 11 to low vacuum, and the drag pump 53 can evacuate the chamber 11 to a higher vacuum corresponding to a lower pressure.

Upstream of the drag pump 53 in the evacuation pipe 23, a pressure control valve 60 is provided. The chamber 11 has a pressure sensor 55 that detects the inner pressure of the chamber 11, and the degree of opening of the pressure control valve 60 is adjusted in accordance with the inner pressure detected by the pressure sensor 55. Moreover, the evacuation mechanism 24 includes an on-off valve 100 according to this embodiment of the present invention between the drag pump 53 and the dry pump 54. Furthermore, another on-off valve 101, which is substantially the same as the on-off valve 100, is provided between the pressure control valve 60 and the chamber 11.

In the side wall of the chamber 11, a transfer opening 25 is provided along with a gate valve G that can open/close the transfer opening 25, so that the substrate S is transferred into/out from the chamber 11 through the opening 25 when the gate valve G is opened. The susceptor 12 has a heater 18 embedded therein.

The process gas supplying system 17 has plural gas sources corresponding to process gases such as CF gas and $O_2$ gas, and these gases are supplied to the chamber 11 from the corresponding gas sources through a commonly used gas supplying line 19 connected to the gas inlet portion 13. Although not shown, the gas supplying line 19 is provided with on-off valves and flow rate controlling devices such as mass flow controllers.

The RLSA microwave plasma process apparatus 10 has a process controller 50 that typically includes a microprocessor (computer). The process controller 50 is electrically connected to the constituent components or devices in the process apparatus 10, which are in turn controlled by the process controller 50. For example, the pressure control valve 60 is controlled by the process controller 50 in accordance with a signal provided by the pressure sensor 55, and the on-off valve 100 is opened or closed under control of the process controller 50. Furthermore, the process controller 50 includes a key board that may be used by an operator of the process apparatus 10 when inputting commands in order to run the RLSA microwave plasma process apparatus 10, and a user interface 51 having a display or the like showing, for example, on-going operations of the process apparatus 10.

The process controller 50 is connected to a memory device 52 that stores programs by which the controller 50 causes the plasma process apparatus 10 to carry out various processes. The programs include a control program for controlling the various processes carried out in the plasma process apparatus 10 under control of the controller 50, and a program (i.e., a recipe) for causing the various components or devices of the plasma process apparatus 10 to perform in accordance with process conditions. In addition, these programs may be stored in a computer-readable storage medium 52a and downloaded to the memory device 52. The computer-readable storage medium 52a may be a hard disk apparatus (including a portable hard disk device), a semiconductor memory including a flash memory, an optical disk including a CD-ROM, a CD-R/RW, and a DVD-R/RW, a magnetic disk including a Floppy Disk, a USB memory, etc. In addition, the programs may be downloaded to the memory device 53 from another apparatus such as a server through a network.

A particular program stored in the memory device 52 is read by the process controller 50 and run in accordance with an instruction input through the user interface 51, so that a corresponding process is carried out in the plasma process apparatus 10.

Next, an example of a process carried out in the RLSA microwave plasma process apparatus 10 is described.

First, the substrate S is transferred into the chamber 11 and placed on the susceptor 12. While the chamber 11 is being evacuated by the evacuation mechanism 24, the process gasses such as the CF gas and $O_2$ gas are supplied into the chamber 11 from the gas supplying system 17 through the gas supplying line 19 and the gas inlet portion 13, so that an etching process or the like is carried out.

In the plasma process apparatus 10, since microwave plasma, which is characterized by radical-rich plasma, low electron temperature, and high density, is produced, only a largely reduced amount of damage is incurred on the substrate S due to the plasma.

When plural process are carried out in the plasma process apparatus 10, a purge gas such as argon (Ar) gas prepared in the process gas supplying system 17 is supplied to the chamber 11, which is still being evacuated by the evacuation apparatus 24, in order to purge the remaining process gases used in a first process from the chamber 11 after the first process is completed. Then, a predetermined gas to be used in a second process is supplied into the chamber 11, and microwave plasma is produced so that the second process is carried out.

Figure 2A:
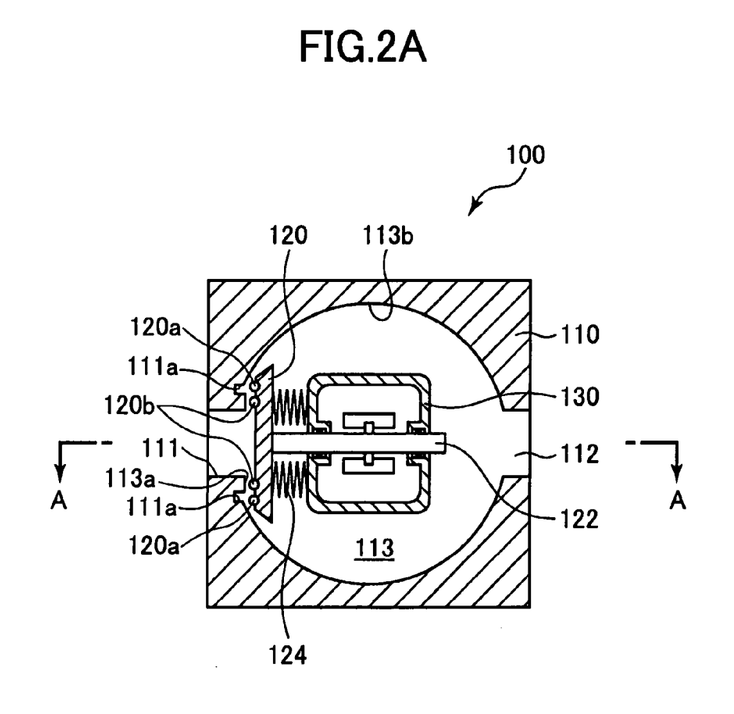
FIG. 2A is a cross-sectional view of an on-off valve according to an embodiment of the present invention, taken along B-B line in FIG. 2B.
Figure 2B:
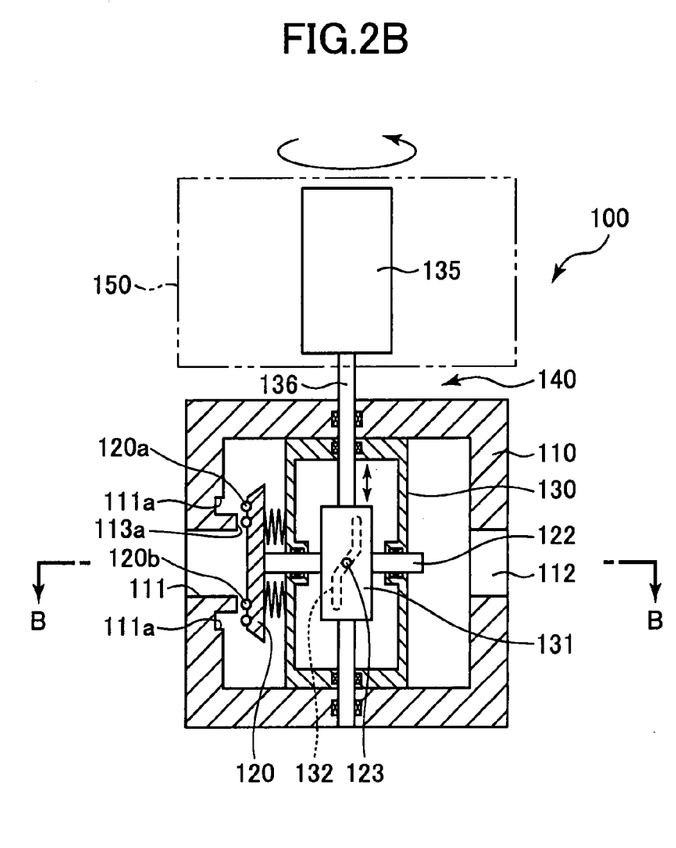
FIG. 2B is another cross-sectional view of the on-off valve, taken along A-A line in FIG. 2A.

FIG. 2A is a cross-sectional view of the on-off valve 100 (101) according to the embodiment of the present invention taken along the B-B line in FIG. 2B, and FIG. 2B is another cross-sectional view taken along the A-A line in FIG. 2A.

The on-off valve 100 has a valve body 110 that has a substantial cubic shape. The valve body 110 has an opening 111 as a gas inlet port in one end and an opening 112 as a gas outlet port in the opposing end. The openings 111, 112 are in pressure communication with each other through a passage way 113 formed in the valve body 110, the passage way having a substantially cylindrical shape.

In the passage way 113, a closure element 120 is provided to be contactable with a circumferential portion 113a that defines the opening 111. A groove 111a is formed around the circumferential portion 113a. The closure element 120 is substantially disk-shaped and has a ring-shaped seal member 120b embedded therein that corresponds to the circumferential portion 113a, in order to hermetically close the opening 111. In addition, the closure element 120 has a protection seal member 120a embedded outside of the seal member 120b to surround the seal member 120b. The seal member 120b is preferably made of complete fluorinated rubber. The protection seal member 120a may be made of the same material as the seal member 120b or other materials in other embodiments. Behind the closure element 120, there is provided a valve rod 122 which slidably goes through a frame body 130 housed in the passage way 113. Between the closure element 120 and the frame body 130, a spring member 124 is provided that can push the closure element 120 toward the opening 111 to force the closure element 120 onto the circumferential portion 113a. The spring member 124 is a spring coil in this embodiment.

In a middle of the valve rod 122, a pin 123 (FIG. 2B) is located to protrude from both sides of the valve rod 122. Both ends of the pin 123 are inserted into cam grooves 132 of corresponding plate cams 131 as a cam mechanism. The pin 123 has a slight gap in relation to the cam grooves 132 but is pressed onto one of the side walls of the cam grooves 132 by the spring member 124. The plate cams 131 are located inside the frame body 130 to sandwich the valve rod 122. In addition, the plate cams 131 are connected to a driving member 135 located outside of the valve body 100 via a rod 136. The rod 136 goes through the frame body 130 and the valve body 110. The driving member 135, which includes a linear motor and an air cylinder, can move the rod 136 along directions shown by a two-headed arrow in FIG. 2B, and thus move the plate cams 131 connected to the rod 136.

Figure 3:
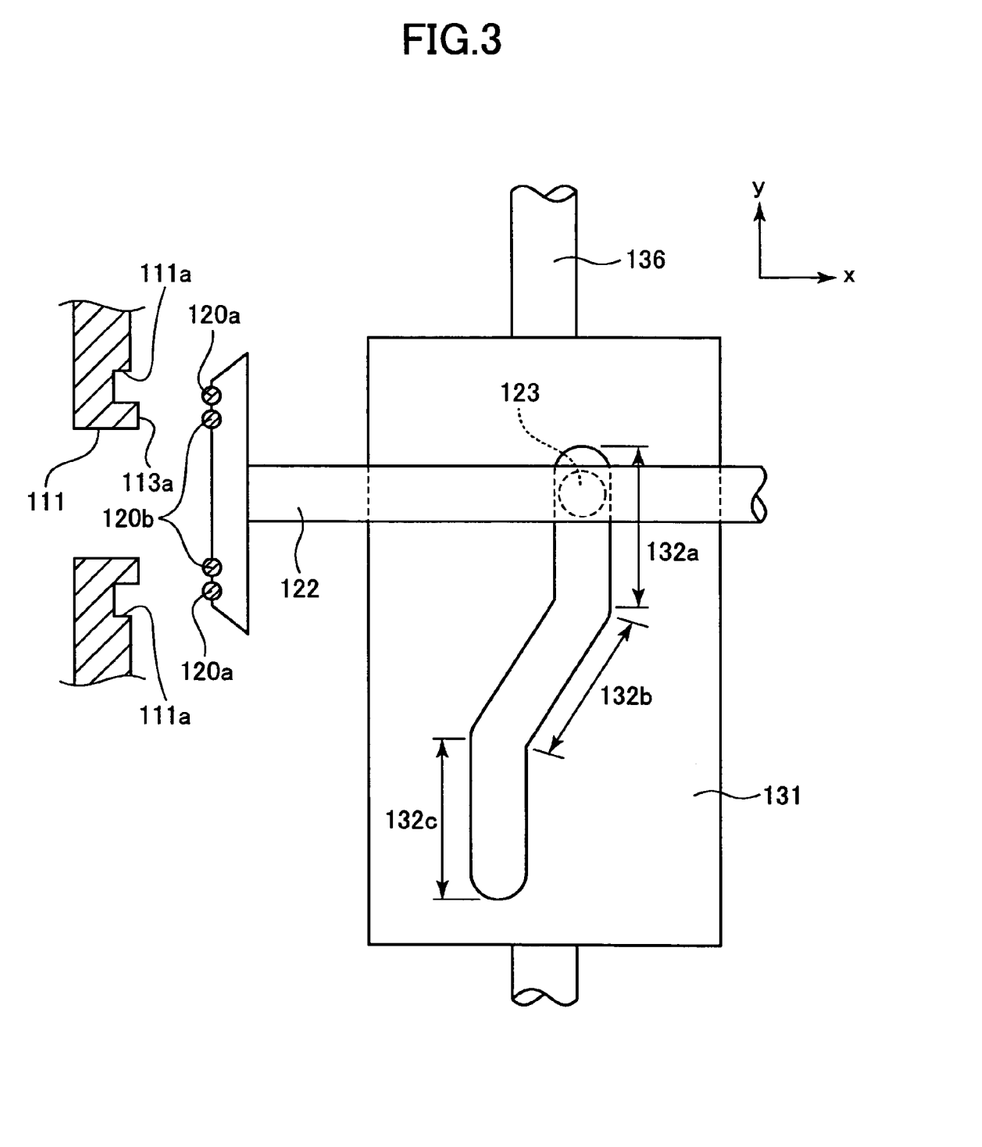
FIG. 3 is an enlarged schematic view showing a cam mechanism.

FIG. 3 is an enlarged diagram showing the closure element 120 and the plate cams 131. The cam grooves 132 of the corresponding plate cams 131 face each other as if one of the cam grooves 132 were a mirror image of the other of the cam grooves 132. Each of the cam grooves 132 has straight portions 132a, 132c that extend in the direction along which the rod 136 is driven (a Y axis direction in FIG. 3), and an oblique portion 132b that extends in a direction changing in the X axis direction and is in pressure communication with the straight portions 132a, 132c.

The plate cams 131 are moved in the Y axis direction by the rod 136. On the other hand, the valve rod 122 and the pin 123 inserted into the valve rod 122 cannot be moved in the Y axis direction since both ends of the valve rod 122 are supported by the frame body 130 that is attached on both inner walls of the valve body 110 (see FIGS. 2A and 2B). Therefore, when the plate cams 131 are moved in the Y axis direction, the pin 123 can only be moved along the cam grooves 132.

When the plate cams 131 are moved in a negative Y axis direction and the pin 123 is moved in the oblique portion 132b of the cam groove 132, the closure element 120 is pulled away from the opening 111 and, thus, the valve 100 is opened. After the pin 123 reaches the straight portion 132a, the closure element 120 stays a predetermined distance away from the opening 111.

On the contrary, when the plate cam 131 moves upward (along a positive Y axis direction), the pin 123 is moved downward from the top most portion of the straight portion 132a of the cam groove 132 in relation to the plate cam 131, and reaches to the oblique portion 132b. Then, when the pin 123 continues to move in the oblique portion 132b, the closure element 120 is moved closer to the opening 111. By the time the pin 123 enters the straight portion 132c, the closure element 120 is pressed onto the circumferential portion of the opening 111 and the seal member 120b is elastically deformed onto the circumferential portion 113a, thereby hermetically closing the opening 111, which thus closes the valve 100.

When the plate cam 131 is moved further upward, the pin 123 enters and moves in the straight portion 132c. At this time the seal element 120b of the closure element 120 is maintained to be pressed onto the circumferential portion 113a. In other words, since the pin 123 can stay in the straight portion 132c, the pin 123 does not go back to the oblique portion 132b. As a result, the seal element 120b is continuously pressed onto the circumferential portion 113a, thereby maintaining the valve 100 closed. Furthermore, the driving member 135, the rod 136, the plate cam 131, the pin 123, and the valve rod 122 together serve as a linear driving mechanism 140 of the closure element 120.

In addition to the linear driving mechanism 140, the on-off valve is provided with a pivotal driving mechanism 150 (FIG. 2B), which can pivot the driving member 135, the rod 136, the frame body 130, the plate cam 131, the valve rod 122, and the closure element 120 in unison around the center axis of the rod 136. Specifically, the pivotal driving mechanism 150 can turn the closure element 120, the valve rod 122, and the frame body about 90 degrees in the passage way 113, so that the closure element can face the opening 111 and a retreat portion 113b that is about 90 degrees away from the opening 111. The pivotal driving mechanism 150 is operated cooperatively with the driving member 135 by a controller (not shown) under instructions of the process controller 50. With this configuration, the closure element 120 can be directed toward the retreat portion 113b by the pivotal driving mechanism 150 and then moved toward the retreat portion 113b. As a result, the protection seal member 120a is pressed onto the retreat portion 113b. A motor with a velocity reducer may be used as the pivotal driving mechanism 150.

Next, according to the embodiment of the present invention, operations of the on-off valve 100 are described in detail, referring to FIGS. 4A through 4E.

Figure 4A:
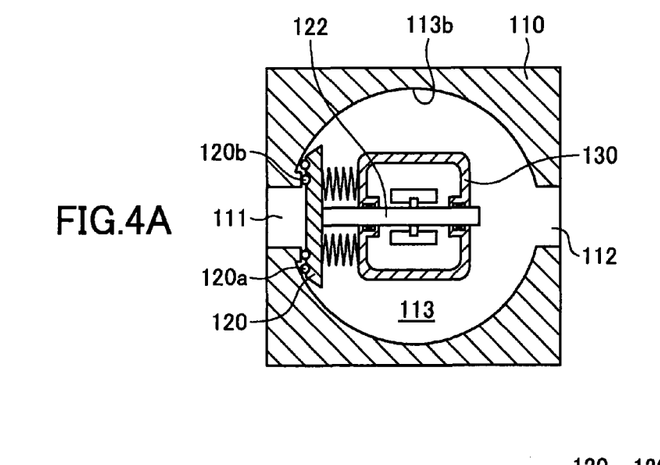
FIGS. 4A through 4E are cross-sectional views illustrating an operation of the on-off valve shown in FIGS. 2A and 2B.

FIG. 4A shows that the closure element 120 closes the opening 111 and thus the on-off valve is closed. Then, the rod 136 is moved to the uppermost position, which in turn moves the plate cams 131 to the uppermost position, and thus the pin 123 is located at the lowermost position of the straight portion 132c, as stated above in reference to FIG. 3. Therefore, the seal member 120b embedded in the closure element 120 is pressed onto the circumferential portion 113a around the opening 111, whereas the protection seal member 120a surrounding the seal member 120b is fitted into the concave groove 111a so that the protection seal member 120a is not pressed onto the bottom surface of the concave groove 11a. With this, the protection seal member 120a cannot be affected by unnecessary repeated deformation, which can lengthen the operational life of the protection seal member 120a.

Figure 4B:
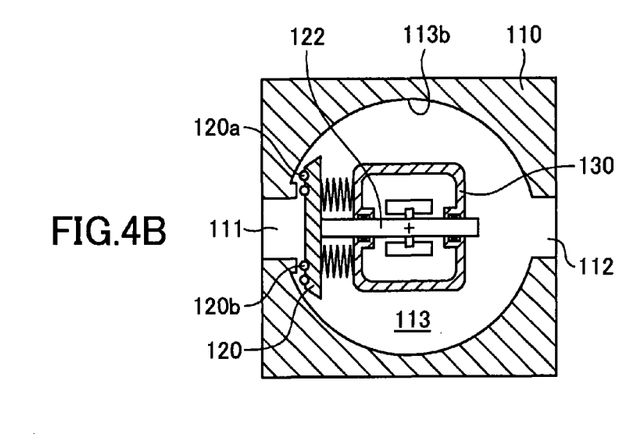

FIG. 4B shows that the closure element 120 is moved away from the opening 111, which allows the openings 111, 112 to be in pressure communication with each other, and thus the valve 100 is opened. Then, the rod 136 is moved to the lowermost position, which in turn moves the plate cams 131 to the lowermost position, and thus the pin 123 is located at the uppermost position of the straight portion 132a, as stated above (see FIG. 3). Specifically, the on-off valve 100 is opened by the plate cams 131 that move from the uppermost position to the lowermost position.

Figure 4C:
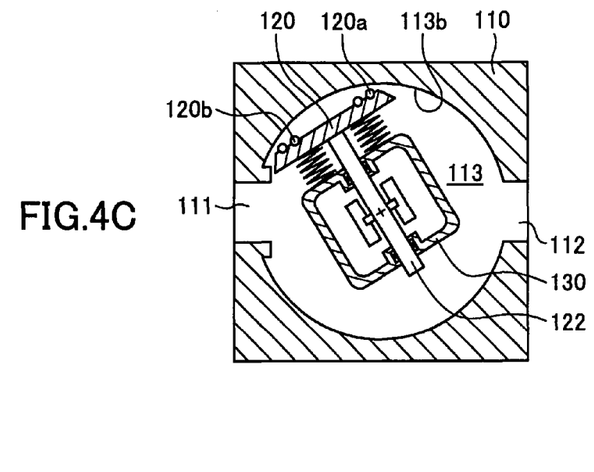

FIG. 4C shows that the closure element 120 and other components that constitute the linear driving portion 140 are turned about 45 degrees by the pivotal driving mechanism 150. The closure element 120 is away from the opening 111 and does not hit any portions of the inner wall of the valve body 110 when the closure element 120 is turned in the passage way 113 since the passage way 130 is formed into a cylindrical shape. Furthermore, the passage way 130 may assume different shapes such as, for example, a sphere in other embodiments, as long as the closure element 120 does not hit the inner wall of the valve body 110.

Figure 4D:
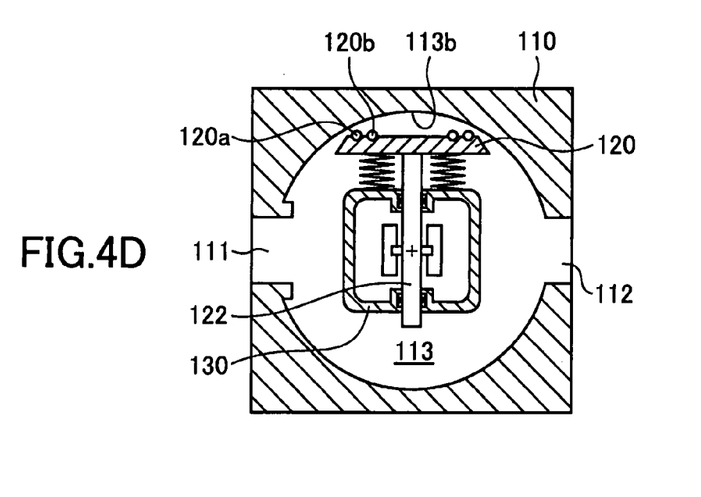

FIG. 4D shows that the closure element 120 is further turned by 90 degrees by the pivotal driving mechanism 150. At this time, the closure element 120 is about 90 degrees away from the original position shown in FIG. 4A in which the closure element is directed toward the opening 111. In FIG. 4D, the closure element 120 is directed toward the retreat portion 113b.

Then, the driving member 135 operates to move the valve rod 136 upward, which then moves the plate cams 131 upward. With such a movement of the plate cams 131, the pin 123 is moved downward relative to the cam grooves 132 to reach the lowermost portion of the straight portion 132c. As a result, the closure element 120 is pushed toward and reaches the retreat portion 113b. In this position, only the protection seal member 120a may be pressed onto the retreat portion 113b, and the seal member 120b does not contact the retreat portion 113b.

Figure 4E:
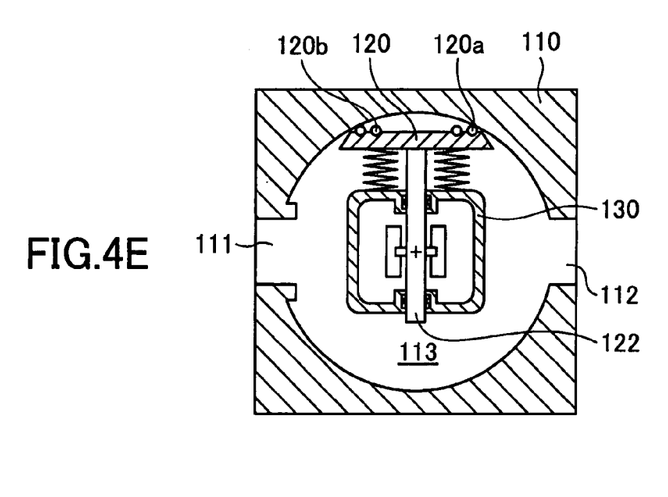

When a plasma process is carried out in the chamber 11, the on-off valve 100 is open in such a manner shown in FIG. 4E. In this case, the gases or the active species flow into the passage way 113 from the chamber 11 (FIG. 11) through the opening 111 and out from the passage way 113 through the opening 112. Even in this situation, because the closure element 120 stays in the retreat portion 113b, the seal member 120b faces the inner wall of the valve body 110, so that the seal member 120b is not directly exposed to the gasses or the like. Therefore, the operational life of the seal member 120b is lengthened, thereby reducing the frequency of replacing the seal members 120b. As a result, the running cost of the plasma process apparatus 10 can be reduced and the production throughput can be increased.

In addition, when the closure element 120 is in the retreat portion 113b, the seal member 120b is slightly away from the inner wall of the valve body 110, and not deformed. Therefore, deterioration of the seal member 120b due to undue repeated deformation can be avoided and the operational life of the seal member 120b can be lengthened. In addition, the frequency of replacing the seal members 120b (or the valve rods 122 and the closure elements 120) and thus the apparatus downtime can be reduced. Moreover, the production throughput can be increased.

While the present invention has been described in reference to the foregoing embodiments, the present invention is not limited to these embodiments, but may be modified or altered within the scope of the accompanying claims. For example, although the passage way 113 is formed into a cylindrical shape as described in reference to FIG. 2, the shape may also be spherical, as briefly mentioned above. In the case of the spherical passage way 113, the entire protection seal member 120a can contact the spherically curved inner wall of the valve body 110 in the retreat portion 113b, when the valve 100 is opened. Therefore, the seal member 120b can be enclosed in a space defined by the closure element 120 (the protection seal member 120a) and the spherically curved retreat portion 113b. As a result, the seal member 120b is completely protected from the gases or the active species from the chamber 11, therefore further lengthening the operational life of the seal member 120b. Furthermore, the protection seal member 120a is fitted into the concave groove 111a when the valve 100 is closed, which contributes to a longer operational life of the protection seal member 120a, as stated above. Therefore, the protection seal member 120a can assuredly protect the seal member 120b for a longer period of time, especially when the inner wall of the valve body 110 is spherically shaped.

In addition, when the passage way 113 in the valve body 110 is formed into a cubic shape, the seal member 120b entirely contacts the planer inner wall of the valve body 110. Even in this case, since the seal member 120b is not exposed to the gases or the active species from the chamber 11, the operational life of the seal member 120b can be lengthened. Moreover, in the case of the planar inner wall, a concave portion is preferably made in the inner wall, which can prevent the seal member 120b from being pressed onto the inner wall, thereby avoiding deterioration of the seal member 120b due to undue repeated deformation.

On the other hand, the seal member 120b is not necessarily enclosed in a closed environment. For example, even when the closure element 120 is away from the retreat portion 113b as shown in FIG. 4D, the closure element 120 is not directed toward the opening 111, when the valve 100 is open. (In other words, the position away from the retreat portion 113b in the above embodiment can work as another retreat portion in other embodiments.) Therefore, the seal member 120b is not directly exposed to the gases or the active species. Namely, the operational life of the seal member 120b can be lengthened even in this situation, compared to when the closure element is directed toward the inlet port in a conventional on-off valve when the valve is open.

Moreover, although the on-off valve 100 is employed in the RLSA microwave plasma process apparatus 10 in the above embodiment, the on-off valve 100 can be employed in other plasma apparatuses, chemical vapor deposition apparatuses, and etching apparatuses in other embodiments.

The present application contains subject matter related to Japanese Patent Application No. 2007-070362 filed with the Japanese Patent Office on Mar. 19, 2007, the entire contents of which are incorporated herein by reference.

What is claimed is:

1. An on-off valve comprising:
   a valve body that is provided within an evacuation pipe, the evacuation pipe being connected between a process chamber and an evacuation apparatus, the evacuation apparatus evacuating the process chamber of a process gas or active species and has two openings that allow the process chamber and the evacuation apparatus to be in pressure communication with each other, the valve body including a cylindrically or spherically curved inner surface away from the two openings;
   a closure element located inside the valve body and adapted to close one of the two openings;
   a seal member provided in the closure element and adapted to seal the one of the two openings when the closure element closes the one of the two openings;
   a protection seal member provided in the closure element to surround the seal member;
   a linear motion driver that linearly moves the closure element;
   a retreat portion provided in the cylindrically or spherically curved inner surface of the valve body; and
   a pivotal motion driver adapted to pivot the closure element between a first position corresponding to the one of the two openings and a second position corresponding to the retreat portion;
   wherein the closure element is positioned in the second position by the linear motion driver and the pivotal motion driver, thereby allowing the process gas or active species to flow through the inner space of the valve body from the process chamber to the evacuation apparatus, at least when a process using the process gas or the active species is carried out in the process chamber, and
   wherein the linear motion driver linearly moves the closure element that has been positioned in the second position, thereby contacting the closure element to the retreat portion, so that the seal member is closed inside the protection seal member and thus not directly exposed to the gases and/or active species from the process chamber, without contacting the cylindrically or spherically curved inner surface of the valve body while the protection seal member contacts the retreat portion.

2. The on-off valve of claim 1, wherein the linear motion driver includes a cam mechanism.

3. The on-off valve of claim 2, wherein the cam mechanism is a plate cam having a groove formed therein.

4. The on-off valve of claim 1, wherein the pivot motion driver pivots the closure element and the cam mechanism.

5. The on-off valve of claim 1, further comprising a groove portion around the one of the two openings, wherein the protection seal member is fitted into the groove portion when the seal element closes the one of the two openings.

6. A process apparatus comprising:
   a process chamber in which an object to be processed is housed, the process chamber being evacuated to a reduced pressure;
   a process mechanism adapted to carry out a predetermined process on the object to be processed;
   an evacuation apparatus adapted to evacuate the process chamber; and
   an on-off valve provided between the process chamber and the evacuation apparatus, wherein the on-off valve includes
   a valve body that is provided within an evacuation pipe, the evacuation pipe being connected between the process chamber and an the evacuation apparatus, the evacuation apparatus evacuating the process chamber of a process gas or active species and has two openings that allow the process chamber and the evacuation apparatus to be in pressure communication with each other, the valve body including a cylindrically or spherically curved inner surface away from the two openings;
   a closure element located inside the valve body and adapted to close one of the two openings;
   a seal member provided in the closure element and adapted to seal the one of the two openings when the closure element closes the one of the two openings;
   a protection seal member provided in the closure element to surround the seal member;
   a linear motion driver that linearly moves the closure element;
   a retreat portion provided in the cylindrically or spherically curved inner surface of the valve body; and
   a pivotal motion driver adapted to pivot the closure element between a first position corresponding to the one of the two openings and a second position corresponding to the retreat portion;
   wherein the closure element is positioned in the second position by the linear motion driver and the pivotal motion driver, thereby allowing the process gas or active species to flow through the inner space of the valve body from the process chamber to the evacuation apparatus, at least when a process using the process gas or the active species is carried out in the process chamber, and
   wherein the linear motion driver linearly moves the closure element that has been positioned in the second position, thereby contacting the closure element to the retreat portion, so that the seal member is closed inside the protection seal member and thus not directly exposed to the gases and/or active species from the process chamber, without contacting the cylindrically or spherically curved inner surface of the valve body while the protection seal member contacts the retreat portion.

* * * * *